United States Patent
Zhou et al.

(10) Patent No.: US 11,228,399 B2
(45) Date of Patent: Jan. 18, 2022

(54) BASE STATION AND DATA RETRANSMISSION METHOD THEREOF

(71) Applicant: SERNET (SUZHOU) TECHNOLOGIES CORPORATION, Jiangsu (CN)

(72) Inventors: Fei Zhou, Jiangsu (CN); Lin Cheng, Jiangsu (CN); Xujing Zhang, Jiangsu (CN)

(73) Assignee: SERNET (SUZHOU) TECHNOLOGIES CORPORATION, Jiangsu (CN)

( * ) Notice: Subject to any disclaimer, the term of this patent is extended or adjusted under 35 U.S.C. 154(b) by 166 days.

(21) Appl. No.: 16/840,465

(22) Filed: Apr. 6, 2020

(65) Prior Publication Data

US 2021/0067272 A1 Mar. 4, 2021

(30) Foreign Application Priority Data

Aug. 29, 2019 (CN) .......................... 201910810392.0

(51) Int. Cl.
| | |
|---|---|
| *H04L 1/18* | (2006.01) |
| *H04W 72/14* | (2009.01) |
| *H04W 28/02* | (2009.01) |
| *H04W 80/02* | (2009.01) |
| *H04W 72/12* | (2009.01) |
| *H04W 72/04* | (2009.01) |

(52) U.S. Cl.
CPC .......... *H04L 1/1812* (2013.01); *H04L 1/1896* (2013.01); *H04W 28/0278* (2013.01); *H04W 72/0406* (2013.01); *H04W 72/1284* (2013.01); *H04W 72/14* (2013.01); *H04W 80/02* (2013.01)

(58) Field of Classification Search
None
See application file for complete search history.

(56) References Cited

U.S. PATENT DOCUMENTS

| | | | |
|---|---|---|---|
| 2012/0033554 A1* | 2/2012 | Shiva ..................... | H04W 72/02 370/235 |
| 2017/0223701 A1* | 8/2017 | Bendle .............. | H04W 72/1289 |
| 2019/0132863 A1* | 5/2019 | Hong .................... | H04W 48/06 |

* cited by examiner

*Primary Examiner* — Robert M Morlan
(74) *Attorney, Agent, or Firm* — JCIPRNET

(57) ABSTRACT

The invention provides a base station and a data retransmission method thereof. The data retransmission method includes the following steps: determining whether at least one data unit is delivered; in response to the at least one data units being undelivered, calculating data sizes corresponding to undelivered data units; determining a resource grant indication according to the data sizes, the resource grant indication being related to radio resources required for resending the undelivered data units; and sending the resource grant indication. In this way, the data units have a higher chance to be completely retransmitted, and signaling transmission can be reduced, thereby reducing transmission delay.

12 Claims, 5 Drawing Sheets

BASE STATION AND DATA RETRANSMISSION METHOD THEREOF

CROSS-REFERENCE TO RELATED APPLICATION

This application claims the priority benefit of China application no. 201910810392.0, filed on Aug. 29, 2019. The entirety of the above-mentioned patent application is hereby incorporated by reference herein and made a part of this specification.

BACKGROUND OF THE INVENTION

1. Field of the Invention

The invention relates to a data retransmission technology, and in particular, to a base station and a data retransmission method thereof.

2. Description of Related Art

An acknowledge mode (AM) is defined in the Radio Link Control (RLC) protocol of the Time Division Duplex (TDD) Long Term Evolution (LTE) architecture to ensure reliability of data transmission at an RLC layer.

FIG. 1 is a schematic diagram of an existing data transmission process. Referring to FIG. 1, LTE is used as an example to first describe uplink transmission. An RLC layer of a user equipment (UE) assembles an RLC protocol data unit (PDU) according to an uplink grant (ul grant) reported by a Media Access Control (MAC) layer, where each RLC PDU has a serial number (SN). The RLC PDU is then delivered to the MAC layer and encapsulated into a MAC PDU (step S101) to be sent to a base station (BS) (step S102). If the base station receives the MAC PDU correctly, the MAC layer will demultiplex the MAC PDU and upload to an upper layer, so that the RLC layer successfully receives the RLC PDU (step S103). If a MAC layer of the base station does not receive the MAC PDU correctly, a hybrid automatic repeat request (HARQ) process of the MAC layer is triggered to perform HARQ retransmission (step S104). If the HARQ retransmission reaches a maximum number of retransmissions (a configurable number of times by the base station), but the MAC PDU is still not received correctly, the base station considers that the HARQ retransmission fails. If RLC layer of the base station does not receive an RLC PDU within a timeout period of reordering timer, the base station will consider that the RLC PDU is lost. Alternatively, if the base station receives a polling request sent by the user equipment, the base station triggers delivery of a status report PDU (step S105). The status report PDU carries a currently valid acknowledgement (ACK) serial number, and all negative acknowledgement (NACK) serial numbers that are not correctly received and smaller than the ACK serial number. After receiving the status report, the user equipment preferentially retransmits the RLC PDU according to the NACK serial number carried in the report. If no uplink grant is currently present, the user equipment triggers a scheduling request (SR) and a buffer status report (BSR) process to obtain the uplink grant, and then retransmits the RLC PDU. This will undoubtedly cause PDUs at the RLC layer not to be retransmitted immediately, and to-be-retransmitted PDUs at the RLC layer may be sent only after a certain number of transmission time interval (TTI) (for example, 1 TTI=1 millisecond (ms)). In addition, if the uplink grant is present, but a data amount corresponding to the current uplink grant is less than a size required for retransmitting the RLC PDU (that is, the uplink grant is not enough to completely retransmit an RLC PDU), RLC PDU fragmentation is caused. In this case, the PDUs retransmitted at the RLC layer may be completely received only after a plurality of TTIs.

Furthermore, downlink transmission is described below. The RLC layer of the base station assembles RLC PDUs according to a downlink grant (dl grant), where each RLC PDU has a serial number. The RLC PDU is then delivered to the MAC layer and encapsulated into a MAC PDU (step S111) to be sent to the user equipment (step S112). If the user equipment receives the MAC PDU correctly, the MAC layer will demultiplex the MAC PDU and upload to an upper layer, so that the RLC layer successfully receives the RLC PDU (step S113). If the MAC layer of the user equipment does not receive the MAC PDU correctly, a HARQ process of the MAC layer is triggered to perform HARQ retransmission (step S114). If the HARQ retransmission reaches a maximum number of retransmissions (the configurable number of times by the base station), but the MAC PDU is still not received correctly, the user equipment considers that the HARQ retransmission fails. If RLC layer of the user equipment does not receive an RLC PDU within a timeout period of reordering timer, the user equipment will consider that the RLC PDU is lost. Alternatively, if the user equipment receives a polling request sent by the base station, the user equipment triggers a status report PDU to be delivered (step S115). Similarly, after receiving the status report, the base station preferentially retransmits the RLC PDU according to the NACK serial number carried in the report. If no downlink grant is currently present, the base station will directly schedule the downlink grant to retransmit the RLC PDU. Moreover, if the downlink grant is present, the base station will directly use the current downlink grant to send to-be-retransmitted RLC PDUs, which may also cause RLC PDU fragmentation, and further cause a transmission delay.

SUMMARY OF THE INVENTION

In view of this, the invention is directed to a base station and a data retransmission method thereof, in which sufficient resources are proactively and appropriately allocated for retransmission of data units, thereby reducing signaling back-and-forth and reducing delay.

According to an embodiment of the invention, the data retransmission method is applicable to the base station, and the data retransmission method includes the following steps: determining whether at least one data unit is delivered; in response to the at least one data unit being undelivered, calculating data sizes corresponding to undelivered data units; determining a resource grant indication according to the data sizes, the resource grant indication being related to radio resources required for resending the undelivered data units; and sending the resource grant indication.

According to an embodiment of the invention, the base station includes at least but is not limited to a receiving circuit, a transmission circuit, and a processing circuit. The receiving circuit is configured to receive a signal. The transmission circuit is configured to send a signal. The processing circuit is coupled to the receiving circuit and the transmission circuit and is configured to perform the following steps: determining whether at least one data unit is delivered; in response to the at least one data units being undelivered, calculating data sizes corresponding to undelivered data units; determining a resource grant indication according to the data sizes, the resource grant indication being related to radio resources required for resending the undelivered data units; and sending the resource grant indication through the transmission circuit.

Based on the above, according to the base station and the data retransmission method of the embodiments of the invention, if it is determined that the data units have not been delivered, the data sizes of those data units are calculated, and radio resources are allocated for retransmission of these data units according to the calculated data sizes. In this way, the data units have a higher chance to be completely retransmitted, and signaling transmission can be reduced, thereby reducing transmission delay.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
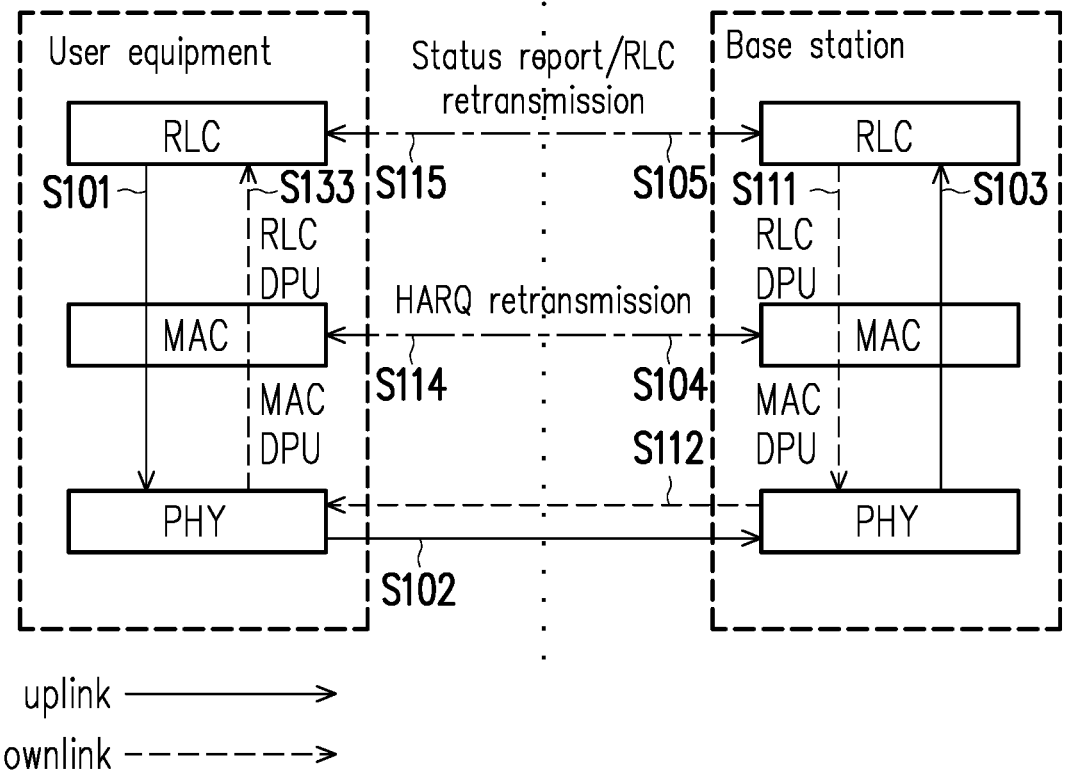
FIG. 1 is a schematic diagram of an existing data transmission process.

Exemplary embodiments of the present invention are described in detail, and examples of the exemplary embodiments are shown in the accompanying drawings. Whenever possible, the same component symbols are used in the drawings and descriptions to indicate the same or similar parts.

Figure 2:
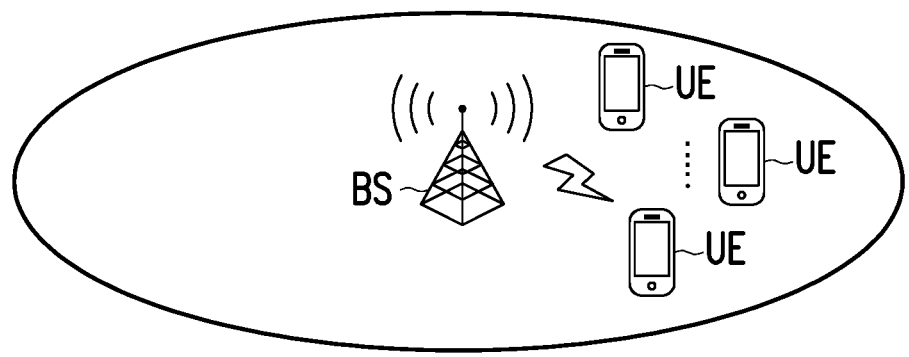
FIG. 2 is a schematic diagram of a communication system according to an embodiment of the invention.

FIG. 2 is a schematic diagram of a communication system 1 according to an embodiment of the invention. The communication system 1 includes but is not limited to at least one base station (BS) and one or more user equipments (UE).

The base station (BS) is, for example (but not limited to), a home evolved Node B (HeNB), an eNB, a next-generation Node B (gNB), an advanced base station (ABS), and a base transceiver system (BTS), a relay, a repeater, and/or a satellite-based communication base station.

Figure 3:
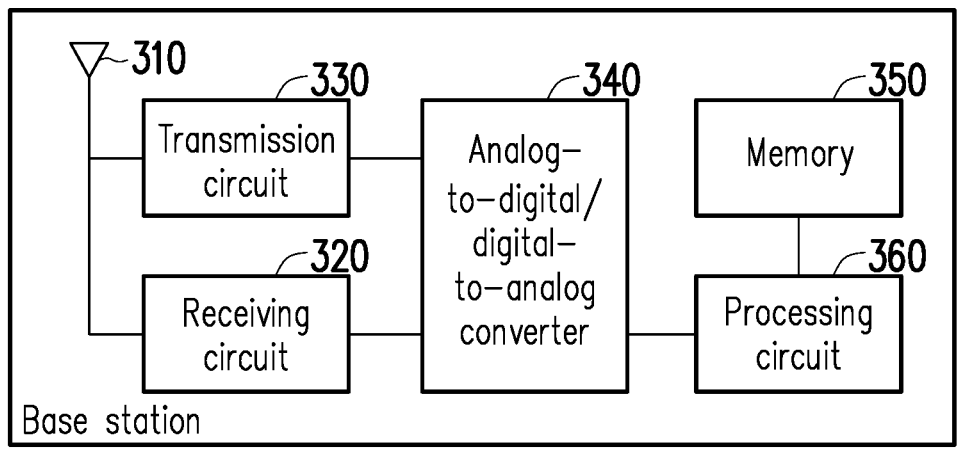
FIG. 3 is a block diagram of components of a base station according to an embodiment of the invention.

FIG. 3 is a block diagram of components of a BS according to an embodiment of the invention. The BS may include at least (but not limited to) one or more antennas 310, a receiving circuit 320, a transmission circuit 330, an analog-to-digital (A/D)/digital-to-analog (D/A) converter 340, a memory 350, and a processing circuit 360.

The receiving circuit 320 and the transmission circuit 330 are respectively configured to wirelessly receive an uplink signal and transmit a downlink signal through the antenna 310. The receiving circuit 320 and the transmission circuit 330 may also perform analog signal processing operations such as low noise amplification, impedance matching, frequency mixing, up-conversion or down-conversion, filtering, amplification, and the like. The analog-to-digital (A/D)/digital-to-analog (D/A) converter 340 is configured to perform analog-to-digital conversion for an uplink and perform digital-to-analog conversion for a downlink.

The memory 350 is, for example (but is not limited to), a random access memory (RAM), a read-only memory (ROM), a flash memory, or a similar component, or a combination of the foregoing components. The memory 350 records a program code, apparatus configuration, a codebook, buffered or permanent data, and records other various communication protocol-related software modules such as a radio resource control (RRC) layer, a physical layer (PHY), a radio link control (RLC) layer, and a media access control (MAC) layer, etc.

The processing circuit 360 is configured to process a digital signal and execute a program according to an exemplary embodiment of the invention, and may access or load data and software modules recorded by the memory 350. The processing circuit 360 may be implemented using programmable units such as a central processing unit (CPU), a microprocessor, a microcontroller, a digital signal processing (DSP) chip, and a field programmable logic gate array (FPGA), etc. The processing circuit 360 may also be implemented using an independent electronic device or an integrated circuit (IC), and operations of the processing circuit 360 may also be implemented through software.

A user equipment (UE) may include (but not limited to), for example, an apparatus such as a mobile station, an advanced mobile station (AMS), a telephone apparatus, a customer premise equipment (CPE), or a wireless sensor, etc.

Figure 4:
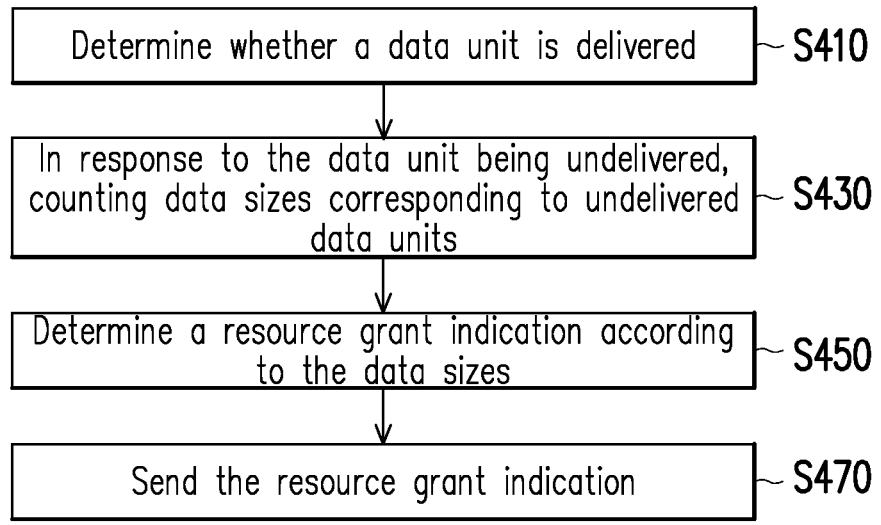
FIG. 4 is a flowchart of a data retransmission method according to an embodiment of the invention.

FIG. 4 is a flowchart of a data retransmission method according to an embodiment of the invention. A processing circuit 360 of a base station (BS) determines whether at least one data unit is delivered (step S410). Specifically, the data unit is, for example, an RLC PDU and a MAC PDU according to the 3GPP specification, or a basic unit (or referred to as an information unit) for transmitting network information (for example, control information, address information, or data) defined by other protocol layers or other protocols. According to different standards or design requirements, mechanisms for determining whether the data unit is undelivered (or lost, actually received, etc.) may be different. Taking LTE as an example, if HARQ retransmission reaches a maximum number of retransmissions, but the MAC PDU is still not received correctly (for example, the BS or the UE does not receive some or all of the data units), the processing circuit 360 may regard the data unit as being undelivered based on a result of the HARQ retransmission failure. As another example, if a reordering timer of an RLC layer does not receive a specific RLC PDU within a timeout period, the processing circuit 360 may determine the data unit as being undelivered after the timeout period expires. As yet another example, whenever the data unit is not received correctly, the processing circuit 360 immediately determines the data unit as being undelivered. A user may change a determining condition in identification mechanism for the data unit being undelivered as required, which is not limited in the embodiment of the invention.

It should be noted that the data unit being undelivered mentioned in the present embodiment include a downlink data unit sent by the BS not being sent to the UE correctly, or an uplink data unit sent by the UE not being sent to the BS correctly.

In response to the data unit being undelivered, the processing circuit 360 calculates data sizes corresponding to undelivered data units (step S430). In an embodiment, in response to receiving or sending of a status report, the processing circuit 360 sums up the data sizes corresponding to all the undelivered data units to generate a to-be-granted size. Specifically, the processing circuit 360 may assign a serial number or a unique identifier to each data unit to easily identify which data units have been delivered correctly and which data units have not been delivered. For uplink transmission, the processing circuit 360 may record a serial number of each unreceived data unit and a corresponding data size thereof to generate a status report accordingly. The status report is related to those undelivered data units. For example, the status report records the serial numbers or identifiers of the undelivered data units, or the serial numbers or identifiers of finally delivered data units.

In an embodiment, in response to the undelivered data units of a protocol layer corresponding to an automatic retransmission request mechanism (for example, an HARQ), the processing circuit 360 triggers sending of a status report of another protocol layer. For example, after the processing circuit 360 determines that the MAC PDU of the MAC layer is not delivered (for example, when the maximum number of retransmissions is reached), the sending of the status report of the RLC layer or the sending of the status report of the UE is triggered. However, in another embodiment, the processing circuit 360 may trigger sending of a status report of a same protocol layer because data units of a certain protocol layer are lost. For example, the reordering timer of the RLC layer has not received the corresponding RLC PDU, receiving of the polling request, or sending of a polling instruction within the timeout period because a polling (or poll) position/field in the RLC PDU is set to 1, the processing circuit 360 may also trigger the sending of the status report of the RLC layer or the sending of the status report of the UE.

On the other hand, the processing circuit 360 may schedule resources for each unreceived data unit to generate a resource grant indication for transmission on the uplink, such as an uplink grant or other notification for indicating radio resources on the uplink or regarding how to use allocated resources. Each resource grant indication is related to radio resources required for resending the undelivered data units, and the resources correspond to a specific data amount. Accordingly, the UE may resend those undelivered data units on the scheduled radio resources.

It should be noted that the processing circuit 360 may not directly (or disable) send (sending) the resource grant indications for different data units first through the transmission circuit 330. Instead, the processing circuit 360 may collect resource grant indications within a specific time interval (for example, 1 TTI, or 10 milliseconds, etc.) or with a specific number (which correspond to undelivered data units within a specific time interval or a specific number of undelivered data units). Next, the processing circuit 360 sums up data amounts corresponding to the resource grant indications, and uses the summed up result as a to-be-granted size (whose value may be greater than or equal to a sum of the data sizes of those undelivered data units) corresponding to those undelivered data units.

In some embodiments, the processing circuit 360 may only sum up data amounts (which correspond to a data size of a specific number of undelivered data units) corresponding to a specific number (for example, 1, 2, 5, etc.) of resource grant indications, and use the summed up result as the to-be-granted size.

On the other hand, for downlink transmission, in an embodiment, in response to the data units being undelivered (that is, the data units not actually received by the UE), the processing circuit 360 needs to learn that which data units are not received by the UE. Therefore, the processing circuit 360 may send a status report indication through the transmission circuit 330 to request the UE to report those undelivered data units. The processing circuit 360 may set the status report indication in a specific field in a header of a data unit that is to be transmitted subsequently, or have the status report indication carried in a specific control signaling. Then, the processing circuit 360 may obtain, through the receiving circuit 320, the status report sent by the UE. The status report is related to the serial numbers or identifiers corresponding to the undelivered data units. For example, a status report of an LTE RLC layer includes an acknowledgement serial number (ACK_SN; used to indicate that which PDUs of the RLC layer have been acknowledged and received by the UE), and a negative acknowledgement serial number (NACK_SN; used to indicate that which PDUs before the acknowledgement serial number have not been acknowledged and received by the UE). The processing circuit 360 may further obtain the data size of each data unit based on the serial numbers or identifiers of the undelivered data units reported by the UE, so that a sum of these data sizes may be calculated and used as the to-be-granted size.

Next, the processing circuit 360 determines the resource grant indications for those undelivered data units according to the calculated data size (step S450). In an embodiment, the processing circuit 360 determines the resource grant indication according to the to-be-granted size summed up from the data sizes corresponding to those undelivered data units. The to-be-granted size may correspond to the data size of one or more undelivered data units. In order to reduce a possibility of data unit fragmentation (the size of the resource grant is less than a data size required for retransmitting the data unit), the processing circuit 360 may schedule those data units that need to be resent (that is, the undelivered data units) once or within a specific number of times (for example, twice, three times, etc.) so that radio resources can be completely sent. The calculated to-be-granted size may be used as a reference for scheduling the required radio resource. For example, resources scheduled by the resource grant indication may correspond to a specific data amount, and the processing circuit 360 may set the data amount to be greater than or equal to the to-be-granted size. Alternatively, based on standards or hardware restrictions, the processing circuit 360 may set the data amount to be less than the to-be-granted size, but the data amount still needs to be sufficient to completely transmit a specific number of undelivered data units so as to avoid segmentation or fragmentation transmission. For example, the processing circuit 360 uses the data sizes corresponding to a specific number of undelivered data units with smaller serial numbers as a data amount corresponding to current scheduling.

In an embodiment, a new scheduled resource grant is related to a configured resource grant. The processing circuit 360 may determine whether a current resource grant indication is configured within a specific time interval (for example, 1 TTI, or 5 milliseconds, etc.) The current resource grant indication represents a resource grant indication to be sent to the UE next or in a next time unit (but not sent yet). It should be noted that the current resource grant indication may not schedule enough radio resources according to the foregoing to-be-granted size, and may cause data unit fragmentation.

In response to absence of the current resource grant indication, the processing circuit 360 may directly determine, according to the to-be-granted size, a data amount corresponding to a new resource grant indication. For example, the data amount corresponding to the resource grant indication is greater than or equal to the to-be-granted size. It should be noted that the data amount may be limited by a maximum allowable grant size (that is, a maximum amount of data that can be transmitted) within a unit time (for example, a TTI or other time units).

In another embodiment, in response to existence of the current resource grant indication, the processing circuit 360 determines the data amount corresponding to the new resource grant indication according to a result obtained through comparison of the to-be-granted size with data amount corresponding to the current resource grant indication. The processing circuit 360 may determine whether the data amount corresponding to the current resource grant indication is sufficient to carry a data amount of the to-be-granted size. In response to the data amount corresponding to the current resource grant indication being not less than the to-be-granted size (that is, the originally scheduled resource is sufficient to send the data amount of the to-be-granted size), the processing circuit 360 may use the data amount corresponding to the current resource grant indication as the data amount corresponding to the new resource grant indication. In other words, the processing circuit 360 reserves an amount of resources determined by the original scheduling. Alternatively, the processing circuit 360 may also determine the data amount corresponding to the new resource grant indication according to the to-be-granted size, and allow those undelivered data units to be preferentially sent on the resource corresponding to the new resource grant indication.

On the other hand, in response to the data amount corresponding to the current resource grant indication being less than the to-be-granted size, it indicates that the originally scheduled resource is insufficient to send the data amount of the to-be-granted size, and the processing circuit 360 may schedule resources according to the to-be-granted size. Based on different standards or hardware restrictions, the processing circuit 360 may determine whether the to-be-granted size is less than a maximum allowable grant size of the resource grant indication. The maximum allowable grant size represents a maximum amount of data that can be transmitted within the unit time.

In response to the to-be-granted size being less than a maximum allowable grant size, it indicates the data amount of the to-be-granted is allowed to be completely sent within a unit time, and the processing circuit 360 may determine the data amount corresponding to the new resource grant indication according to the to-be-granted size. For example, an amount of scheduled data is greater than or equal to the to-be-granted size.

In response to the to-be-granted size being not less than maximum allowable grant size, it indicates that the data amount of the to-be-granted size cannot be completely sent within the unit time, and the processing circuit 360 may use the data amount corresponding to the current resource grant indication as the data amount corresponding to the new resource grant indication. That is, the processing circuit 360 reserves the amount of resources determined by the original scheduling. Alternatively, the processing circuit 360 may use the maximum allowable grant size as the data amount corresponding to the new resource grant indication.

After the new resource grant indication is determined, the processing circuit 360 may send the resource grant indication through the transmission circuit 330 (step S470). In this case, the amount of resources scheduled by the resource grant indication is determined based on the foregoing conditions such as the to-be-granted size, the amount of scheduled data, or the maximum allowable grant size. The resource grant indication is an indication (for example, an uplink grant, a downlink grant, or other notification for indicating radio resources on the uplink or downlink, or regarding how to use allocated resources) used to instruct a specific UE to retransmit or re-receive previously undelivered data units on a predetermined resource. In this way, in the embodiment of the invention, enough resources may be scheduled for the undelivered data units to avoid wasting extra time on resource application and grant signaling and reduce data unit fragmentation, thereby avoiding transmission delay.

In addition, after these undelivered data units are resent, the processing circuit 360 continues to confirm whether the undelivered data units have been actually delivered. The processing circuit 360 may determine, through the status report or a confirmation response of a retransmission mechanism, whether the data units have been delivered. In an embodiment, in response to the undelivered data units being delivered after being resent, the processing circuit 360 may update the to-be-granted size according to data sizes corresponding to the delivered data units. For example, the processing circuit 360 subtracts the data sizes corresponding to the delivered data units from the to-be-granted size, and uses the calculation result as the new to-be-granted size. The processing circuit 360 may then determine the data amount corresponding to the next resource grant indication according to the new to-be-granted size.

In order to help the reader understand the spirit of the application, embodiments will be described below for description.

Figure 5:
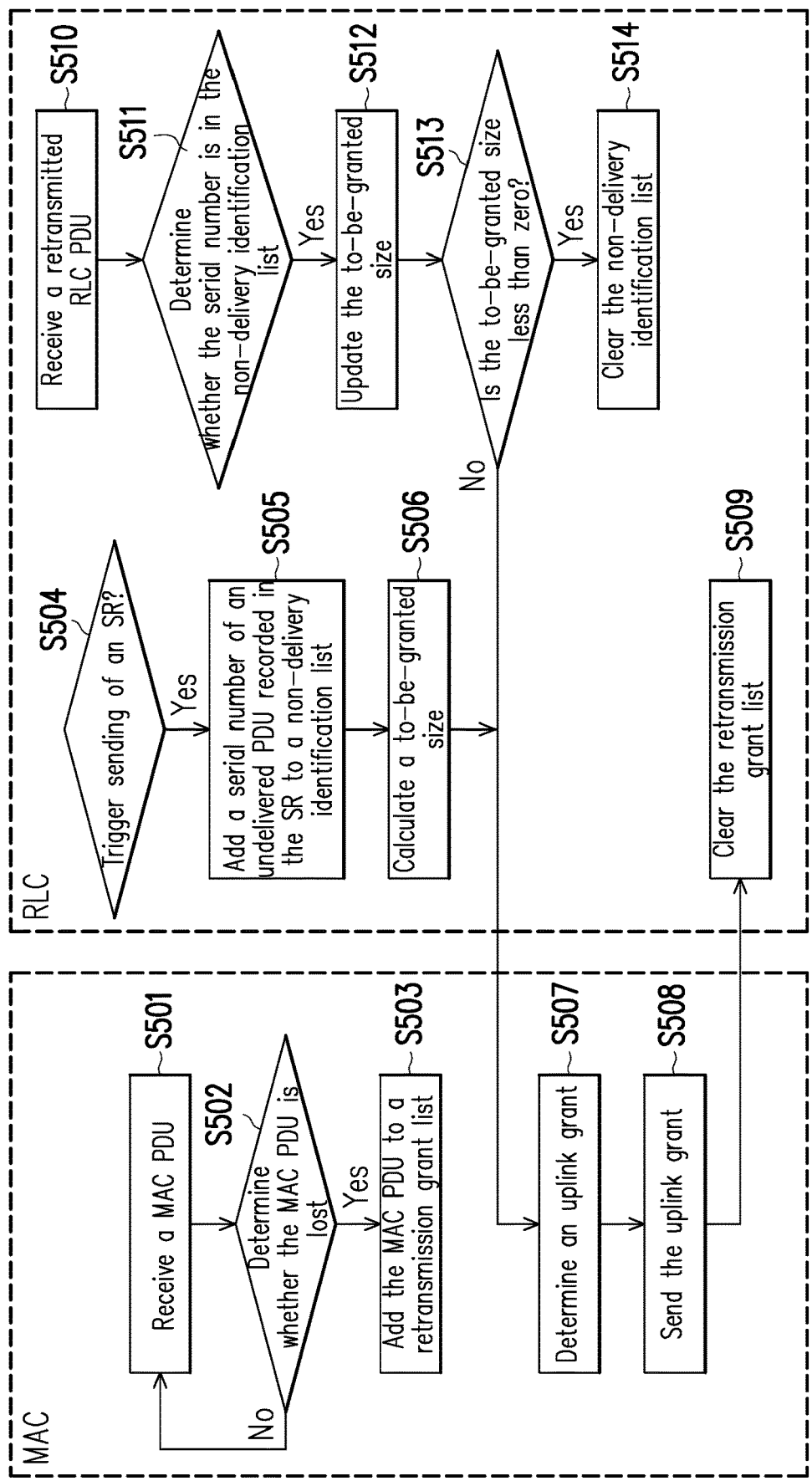
FIG. 5 is a flowchart of a data retransmission method for uplink transmission according to an embodiment of the invention.

FIG. 5 is a flowchart of a data retransmission method for uplink transmission according to an embodiment of the invention. Taking the 3GPP LTE standard as an example, a MAC layer of a BS receives a MAC PDU from a UE (step S501). The BS detects whether the MAC PDU is lost (step S502). If retransmissions of the lost MAC PDU based on a HARQ mechanism reach a maximum number of retransmissions but the BS still does not receive the MAC PDU correctly, the BS considers that the MAC PDU has been lost. If it is detected that the MAC PDU is lost, the BS adds the MAC PDU to a retransmission grant list (step S503). The retransmission grant list is created and maintained by the MAC layer, and records a serial number corresponding to an undelivered MAC PDU and a data size (or granted resources). On the other hand, an RLC layer of the BS confirms whether a status report (SR) is transmitted to the UE (step S504). If the RLC layer triggers sending of the status report, the BS adds, to a non-delivery identification list, a negative acknowledgement serial number carried in the status report (step S505). The non-delivery identification list is created and maintained by the RLC layer, and records a serial number corresponding to an undelivered RLC PDU. The BS sequentially reviews the retransmission grant list, adds up (that is, calculates a to-be-granted size) data amounts corresponding to uplink grants of all nodes (items) in the retransmission grant list, and sends the to-be-granted size to the MAC layer through the RLC layer (step S506). After the MAC layer receives the to-be-granted size, the BS may determine a data amount corresponding to the uplink grant according to the to-be-granted size (step S507).

Figure 6:
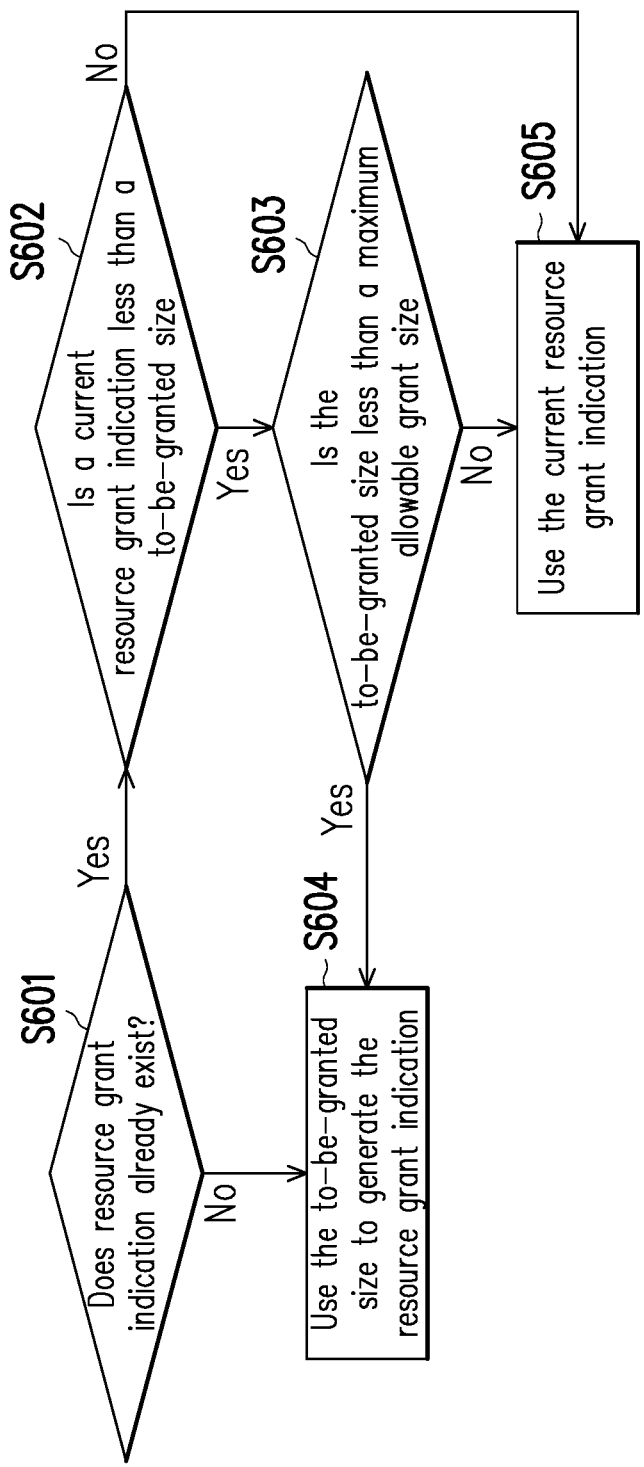
FIG. 6 is a flowchart for scheduling resource grant indication according to an embodiment of the invention.

FIG. 6 is a flowchart for scheduling resource grant indication according to an embodiment of the invention. Referring to FIG. 6, a BS checks, in a current TTI (a minimum time scheduling unit of an LTE system; 1 TTI equals 1 ms), whether a resource grant indication (an uplink grant or a downlink grant) of a user equipment is present (step S601).

For example, for the uplink, if the BS has scheduled an uplink grant to the UE at the current TTI based on the received status report or a buffer status report request, the BS may consider that the resource grant indication of the UE already exists in the current TTI. For the downlink, if the BS has scheduled a downlink grant to the UE at the current TTI based on a new downlink data unit, the BS may consider that the resource grant indication of the UE already exists in the current TTI.

If the resource grant indication of the UE exists in the current TTI, the BS then checks whether the data amount corresponding to the resource grant indication of the current TTI is less than a to-be-granted size (step S602). If the resource grant indication of the current TTI is less than the to-be-granted size, the BS then checks whether the to-be-granted size is less than a maximum allowable grant size within the TTI (step S603). If the to-be-granted size is less than the maximum allowable grant size, or the resource grant indication of the UE does not exist in the current TTI, the BS uses the to-be-granted size as a data amount corresponding to a new resource grant indication, and accordingly schedules corresponding resources for the UE (step S604). If the data amount corresponding to the resource grant indication of the current TTI is greater than the to-be-granted size, or the to-be-granted size is larger than the maximum allowable grant size within the TTI, the BS uses the data amount corresponding to the current resource grant indication to schedule resources for the UE (step S605).

Referring to FIG. 5, after scheduling is completed, the BS sends a final scheduled uplink grant to the UE (step S508). The data amount corresponding to the uplink grant is obtained based on the embodiment of FIG. 6. In this case, the BS may clear a retransmission grant list (step S509). In addition, an RLC layer of the BS receives an RLC PDU retransmitted by the UE (step S510). The BS checks whether a serial number of the received RLC PDU is included in a non-delivery identification list (step S511). If the serial number is in the non-delivery identification list, the BS updates the to-be-granted size (its value is obtained through subtracting the data size of the retransmitted RLC PDU from the original to-be-granted size) (step S512). The BS may detect whether the updated to-be-granted size is less than zero (step S513), so as to confirm that PDUs corresponding to the retransmission grant list are all successfully retransmitted. If the to-be-granted size is not less than zero, the BS sends the updated to-be-granted size to the MAC layer through the RLC layer, and performs step S508 again. In this case, a data amount corresponding to the newly-sent uplink grant is determined based on the updated to-be-granted size. On the other hand, if the to-be-granted size is not greater than zero, the BS may clear the non-delivery identification list (step S514).

Figure 7:
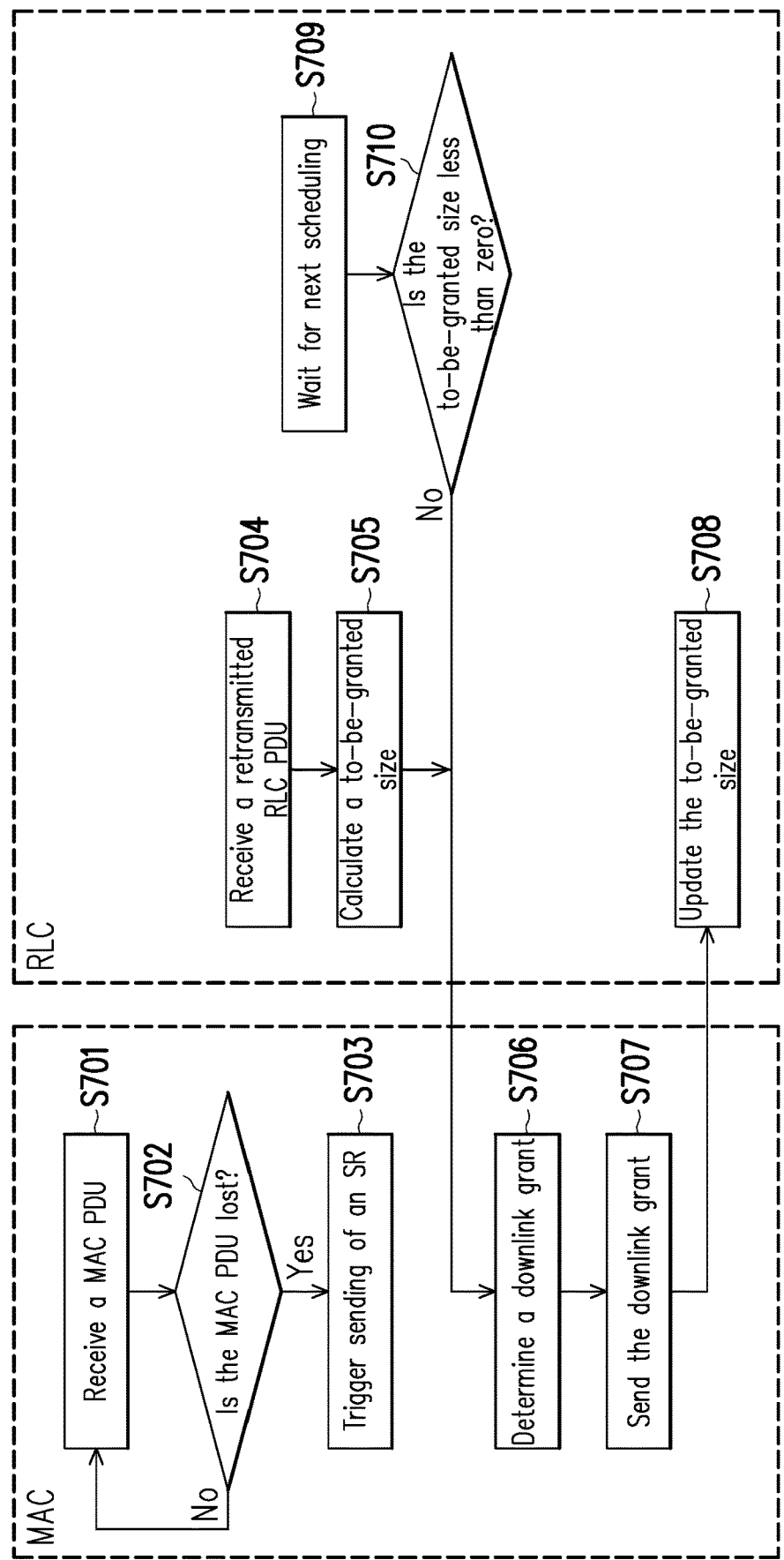
FIG. 7 is a flowchart of a data retransmission method for downlink transmission according to an embodiment of the invention.

FIG. 7 is a flowchart of a data retransmission method for downlink transmission according to an embodiment of the invention. Referring to FIG. 7, a MAC layer of a BS sends a MAC PDU to a UE (step S701). The BS detects whether the MAC PDU is lost (step S702). For example, if the MAC PDU is still not received correctly after HARQ retransmission reaches a maximum number of retransmissions, the BS considers that the MAC PDU has been lost. If it is detected that the MAC PDU is lost, the BS may trigger the UE to send a status report PDU (step S703). For example, the BS may trigger the UE to send the status report by setting a polling position/field in the newly sent RLC PDU to 1. Next, an RLC layer of the BS receives the status report PDU (step S704). The BS may sum up data sizes of RLC PDUs corresponding to all negative acknowledgement serial numbers in the status report to obtain a to-be-granted size, and send the calculated to-be-granted size to the MAC layer through the RLC layer (step S705). After receiving the to-be-granted size, the MAC layer of the BS may determine a downlink grant (step S706). For example, the BS may use the data amount obtained based on the embodiment of FIG. 6 as the data amount corresponding to the downlink grant. After scheduling of the downlink grant is completed, the BS may send the final scheduled downlink grant to the UE (step S707), and update the to-be-granted size (whose value is obtained through subtracting the data amount corresponding to the final scheduled downlink grant from the original to-be-granted size) (step S708). Next, the BS waits until the next TTI scheduling time comes (step S709). The BS may detect whether the updated to-be-granted size is less than zero (step S710). If the to-be-granted size is not less than zero, the BS sends the to-be-granted size to the MAC layer through the RLC layer, and performs step S706. In this case, a data amount corresponding to the newly-sent downlink grant is determined based on the updated to-be-granted size. If the to-be-granted size is not greater than zero, it indicates that a retransmission process for the previously undelivered data units has ended, and there is no need to schedule resources for these data units.

It should be noted that, in the embodiments shown in FIG. 5 and FIG. 7, the data amount corresponding to the uplink grant or downlink grant required for the RLC PDU retransmission is determined based on the loss of the MAC PDU. Further, in response to receiving or sending of the status report, an occasion for scheduling of the RLC PDU retransmission is determined, and the data amount is determined based on the data size of the PDUs retransmitted by the RLC layer. In this way, segmentation of the PDU retransmitted by the RLC layer can be avoided, and it can be guaranteed that the PDUs are retransmitted preferentially and fast. In other embodiments, according to different generations of mobile communication standards or other communication technologies, retransmission of the RLC layer may be changed to retransmission of data units of other protocol layers, which is not limited in the embodiments of the application.

In summary, according to the base station and the data retransmission method of the embodiments of the invention, after it is confirmed that the data unit is not sent to the user equipment or the base station, the base station may collect statistics about data sizes of those undelivered data units, and proactively and properly allocate radio resources based on the statistical data sizes, thereby avoiding wasting time on resource application and grant signaling. The data amount corresponding to the radio resource may be greater than the data size of those undelivered data units, and the data units should not be transmitted in segments, so as to quickly resend those undelivered data units, thereby avoiding a transmission delay.

It should be finally noted that the above embodiments are merely intended for describing the technical solutions of the present invention other than limiting the present invention. Although the present invention is described in detail with reference to the foregoing embodiments, persons of ordinary skill in the art should understand that they can still make modifications to the technical solutions described in the foregoing embodiments or make equivalent substitutions to some technical features thereof, without departing from scope of the technical solutions of the embodiments of the present invention.

What is claimed is:

1. A data retransmission method applicable to a base station, wherein the data retransmission method comprises:
   determining whether at least one data unit is delivered;
   in response to the at least one data unit being undelivered, calculating data sizes corresponding to undelivered data units;
   determining a resource grant indication according to the data sizes, wherein the resource grant indication is related to radio resources required for resending the undelivered data units; and
   sending the resource grant indication.

2. The data retransmission method according to claim 1, wherein the step of calculating the data sizes corresponding to the undelivered data units comprises:
   in response to receiving or sending of a status report, summing up the data sizes corresponding to all the undelivered data units to generate a to-be-granted size, wherein the status report is related to the undelivered data units; and
   determining the resource grant indication according to the to-be-granted size summed up from the data sizes.

3. The data retransmission method according to claim 2, wherein the step of determining the resource grant indication according to the to-be-granted size summed up from the data sizes comprises:
   determining whether a current resource grant indication is configured;
   in response to absence of the current resource grant indication, determining, according to the to-be-granted size, a data amount corresponding to a new resource grant indication; and
   in response to existence of the current resource grant indication, determining, according to a result obtained through comparison of the to-be-granted size with a data amount corresponding to the current resource grant indication, the data amount corresponding to the new resource grant indication.

4. The data retransmission method according to claim 3, wherein the step of determining, according to the result obtained through comparison of the to-be-granted size with the data amount corresponding to the current resource grant indication, the data amount corresponding to the new resource grant indication comprises:
   in response to the to-be-granted size being less than a maximum allowable grant size, determining, according to the to-be-granted size, the data amount corresponding to the new resource grant indication; and
   in response to the to-be-granted size being not less than the maximum allowable grant size, using the data amount corresponding to the current resource grant indication as the data amount corresponding to the new resource grant indication.

5. The data retransmission method according to claim 2, wherein the step of receiving or sending the status report comprises:
   in response to the undelivered data units of a protocol layer corresponding to an automatic retransmission request mechanism, triggering receiving or sending of the status report.

6. The data retransmission method according to claim 2, wherein after the step of sending the resource grant indication, the method further comprises:
   in response to the undelivered data units being delivered after being resent, updating the to-be-granted size according to data sizes corresponding to the delivered data units.

7. A base station, comprising:
   a receiving circuit configured to receive a signal;
   a transmission circuit configured to send a signal; and
   a processing circuit coupled to the receiving circuit and the transmission circuit and configured to:
      determine whether at least one data unit is delivered;
      in response to the at least one data unit being undelivered, calculating data sizes corresponding to undelivered data units;
      determine a resource grant indication according to the data sizes, wherein the resource grant indication is related to radio resources required for resending the undelivered data units; and
      send the resource grant indication through the transmission circuit.

8. The base station according to claim 7, wherein the processing circuit is configured to:
   in response to receiving or sending of a status report, sum up the data sizes corresponding to all the undelivered data units to generate a to-be-granted size, wherein the status report is related to the undelivered data units; and
   determine the resource grant indication according to the to-be-granted size summed up from the data sizes.

9. The base station according to claim 8, wherein the processing circuit is configured to:
   determine whether a current resource grant indication is configured;
   in response to absence of the current resource grant indication, determine, according to the to-be-granted size, a data amount corresponding to a new resource grant indication; and
   in response to existence of the current resource grant indication, determine, according to a result obtained through comparison of the to-be-granted size with a data amount corresponding to the current resource grant indication, the data amount corresponding to the new resource grant indication.

10. The base station according to claim 9, wherein the processing circuit is configured to:
    in response to the to-be-granted size being less than a maximum allowable grant size, determine, according to the to-be-granted size, the data amount corresponding to the new resource grant indication; and
    in response to the to-be-granted size being not less than the maximum allowable grant size, use the data amount corresponding to the current resource grant indication as the data amount corresponding to the new resource grant indication.

11. The base station according to claim 8, wherein the processing circuit is configured to:
    in response to the undelivered data units of a protocol layer corresponding to an automatic retransmission request mechanism, trigger receiving or sending of the status report.

12. The base station according to claim 8, wherein the processing circuit is configured to:
    in response to the undelivered data units being delivered after being resent, update the to-be-granted size according to data sizes corresponding to the delivered data units.

* * * * *